US012120505B2

(12) United States Patent
O'Kane et al.

(10) Patent No.: US 12,120,505 B2
(45) Date of Patent: Oct. 15, 2024

(54) AUTOMATED ACCESS DEVICE INTERACTION PROCESSING

(71) Applicant: Visa International Service Association, San Francisco, CA (US)

(72) Inventors: Christopher O'Kane, Maghera (GB); Samuel Wallace, Belfast (GB); Peter Lennon, Belfast (GB); Kevin White, Donaghadee (GB)

(73) Assignee: Visa International Service Association, San Francisco, CA (US)

( * ) Notice: Subject to any disclaimer, the term of this patent is extended or adjusted under 35 U.S.C. 154(b) by 248 days.

(21) Appl. No.: 17/432,012

(22) PCT Filed: May 1, 2019

(86) PCT No.: PCT/US2019/030152
§ 371 (c)(1),
(2) Date: Aug. 18, 2021

(87) PCT Pub. No.: WO2020/222837
PCT Pub. Date: Nov. 5, 2020

(65) Prior Publication Data
US 2022/0150692 A1     May 12, 2022

(51) Int. Cl.
*H04W 12/033* (2021.01)
*G06F 9/54* (2006.01)
*H04L 9/14* (2006.01)

(52) U.S. Cl.
CPC .......... *H04W 12/033* (2021.01); *G06F 9/547* (2013.01); *H04L 9/14* (2013.01)

(58) Field of Classification Search
CPC .. G06F 9/547; G06Q 20/322; G06Q 20/3272; G06Q 20/3821; G06Q 20/401; G06Q 20/40145; H04L 63/0442; H04L 63/0861; H04L 67/125; H04L 9/0825; H04L 9/14; H04L 9/3213; H04W 12/03; H04W 12/033; H04W 12/08; H04W 12/50
See application file for complete search history.

(56) References Cited

U.S. PATENT DOCUMENTS

2003/0014315 A1*  1/2003  Jaalinoja ................. G06Q 20/16
                                                                       705/18
2004/0098350 A1*  5/2004  Labrou .................... G06Q 20/12
                                                                       705/64

(Continued)

FOREIGN PATENT DOCUMENTS

WO   WO-2012068292 A1 *  5/2012  ............. G06F 21/34
WO   2018226904 A1      12/2018

OTHER PUBLICATIONS

PCT/US2019/030152 , "International Search Report and Written Opinion", Jan. 31, 2020, 20 pages.

*Primary Examiner* — Theodore C Parsons
(74) *Attorney, Agent, or Firm* — Kilpatrick Townsend & Stockton LLP

(57) ABSTRACT

A method is disclosed. The method includes forming a local data connection between a mobile communication device comprising a voice assistant module, and an access device in an interaction. The method also includes receiving, by the mobile communication device, a voice command with a request for the access device to automatically provide a resource to a user of the mobile communication device.

20 Claims, 6 Drawing Sheets

(56) References Cited

U.S. PATENT DOCUMENTS

| | | |
|---|---|---|
| 2016/0335620 A1 | 11/2016 | Lyons et al. |
| 2017/0193479 A1 | 7/2017 | Kamat |
| 2018/0121912 A1* | 5/2018 | Morales .............. H04W 12/041 |
| 2018/0300981 A1* | 10/2018 | Gaur .................... G06Q 10/087 |
| 2018/0309741 A1 | 10/2018 | Neafsey et al. |
| 2019/0089531 A1* | 3/2019 | Le Saint ................ G06Q 20/20 |
| 2022/0150692 A1* | 5/2022 | O'Kane ............... G06Q 20/322 |

* cited by examiner

AUTOMATED ACCESS DEVICE INTERACTION PROCESSING

CROSS-REFERENCES TO RELATED APPLICATIONS

This application is a National Stage of International Application No. PCT/US2019/030152, filed on May 1, 2019, of which is herein incorporated by reference in its entirety for all purposes.

BACKGROUND

A number individuals can have disabilities and can have problems accessing resources at access devices such as ticket dispensers, vending machines, ATMs, parking kiosks, etc. For example, some individuals may be unable to reach a keypad on an access device such as a particular kiosk or vending machine, because they may be confined to wheelchairs. In another example, some individuals may be visually impaired, making it difficult for them to interact with certain access devices. Such individuals may therefore be unable to obtain the resources that might be provided by access devices.

Another problem that needs to be addressed is that some access devices such as vending machines and parking meters may have interfaces that are confusing to individuals. Many parking meters, for example, have very complicated instructions for operating them, and the types of interfaces on parking meters may vary by location or manufacturer. It is difficult for individuals to learn how to operate many different access devices with different user interfaces. If individuals do not know how to use interfaces on access devices, they may get frustrated and abandon further interaction with the access devices.

Embodiments of the invention address these and other problems individually and collectively.

BRIEF SUMMARY

Embodiments improve the interactions with access devices relative to conventional systems.

One embodiment includes a method including: forming a local data connection between a mobile communication device comprising a voice assistant module, and an access device in an interaction; and receiving, by the mobile communication device, a voice command with a request for the access device to provide a resource to a user of the mobile communication device.

Another embodiment includes a mobile communication device comprising: a processor; and a computer readable medium coupled to the processor and containing instructions for causing the processor to perform a method comprising: forming a local data connection between a mobile communication device comprising a voice assistant module, and an access device in an interaction; and receiving, by the mobile communication device, a voice command with a request for the access device to automatically provide a resource to a user of the mobile communication device.

Another embodiment includes a method comprising: forming a local data connection between a mobile communication device comprising a voice assistant module, and an access device in an interaction; and automatically providing, by the access device, a resource to a user of the mobile communication device after the mobile communication device receives a voice command with a request for the access device to provide the resource to the user of the mobile communication device.

Another embodiment of the invention includes an access device comprising: a processor; and a computer readable medium comprising code, executable by the processor for implementing a method that includes: forming a local data connection between a mobile communication device comprising a voice assistant module, and an access device in an interaction; and automatically providing, by the access device, a resource to a user of the mobile communication device after the mobile communication device receives a voice command with a request for the access device to provide the resource to the user of the mobile communication device.

Further details regarding embodiments of the invention can be found in the Detailed Description and the Figures.

DETAILED DESCRIPTION

Figure 1:
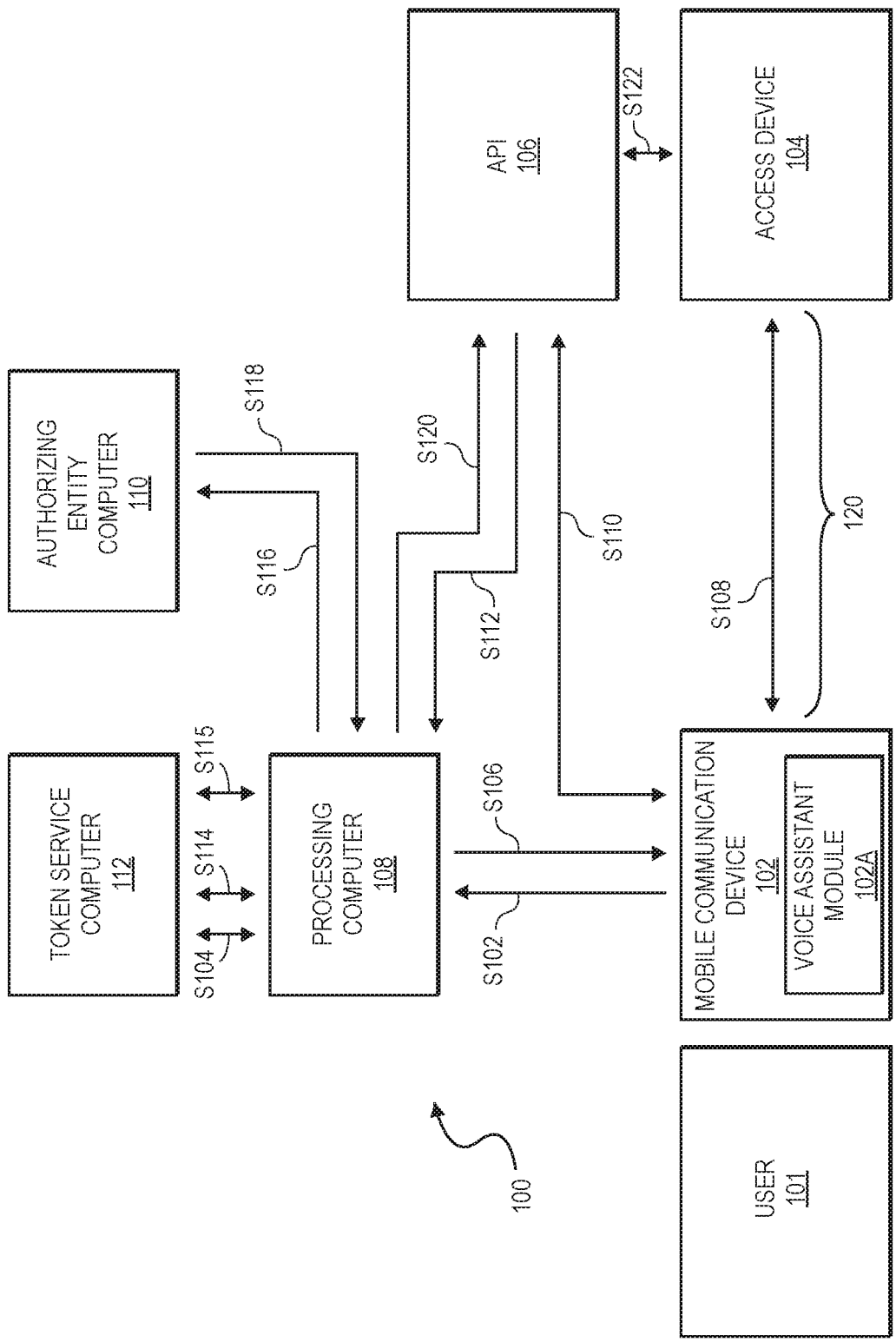
FIG. 1 shows a block diagram of a system along with a process flow according to an embodiment.

Prior to discussing embodiments of the invention, some terms can be described in further detail.

A "local data connection" can include a short range communication connection between two or more devices that are intended to interact with each other. A local data connection can be formed using an RF mode of communication such as near field communications (NF), Bluetooth, Bluetooth Low Energy (BLE), etc. In other embodiments, another mode of communication such as light (e.g., infrared) or audio signals may be used.

A "key" may include a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "public key" may include an encryption key that may be shared openly and publicly. The public key may be designed to be shared and may be configured such that any information encrypted with the public key may only be decrypted using a private key associated with the public key (i.e., a public/private key pair).

A "private key" may include any encryption key that may be protected and secure. A private key may be securely stored at an entity and may be used to decrypt any information that has been encrypted with an associated public key of a public/private key pair associated with the private key.

A "public/private key pair" may refer to a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. In some embodiments, the public key may be authorized by a body known as a Certification Authority (CA) which stores the public key in a database and distributes it to any other entity which requests it. The private key can typically be kept in a secure storage medium and will usually only be known to the entity. Public and private keys may be in any suitable format, including those based on Rivest-Shamir-Adleman (RSA) or elliptic curve cryptography (ECC).

An "access device" may be any suitable device that provides access to a resource. An access device may be in any suitable form. Some examples of access devices include vending machines, kiosks, POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), and the like. An access device may use any suitable contact or contactless mode of operation to send or receive data from, or associated with, a user mobile communication device. In some embodiments, an access device may include a reader, a processor, and a computer-readable medium. A reader may include any suitable contact or contactless mode of operation. For example, exemplary readers can include radio frequency (RF) antennas, optical scanners, bar code readers, or magnetic stripe readers to interact with a payment device and/or mobile communication device.

"Access data" may include any suitable data that can be used to access a resource or create data that can access a resource. In some embodiments, access data may be account information for a payment account. Account information may include a PAN, payment token, expiration date, card verification values (e.g., CVV, CVV2), dynamic card verification values (dCVV, dCVV2), an identifier of an issuer with which an account is held, etc. In other embodiments, access data could include data that can be used to access a location or to access secure data. Such information may be ticket information for an event, data to access a building, transit ticket information, passwords, biometrics or other credentials to access secure data, etc.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer.

A "resource provider" may be an entity that can provide a resource such as goods, services, information, and/or access to a location (e.g., a parking space, a transit terminal, etc.). Examples of resource providers include merchants, governmental authorities, secure data providers, etc. A resource provider may operate one or more access devices.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "mobile communication device" may comprise any suitable electronic device that may be transported and operated by a user, which may also optionally provide remote communication capabilities to a network. Examples of remote communication capabilities include using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile communication devices include mobile phones (e.g. cellular phones), PDAs, tablet computers, net books, laptop computers, wearable devices (e.g., watches), vehicles such as automobiles and motorcycles, personal music players, hand-held specialized readers, etc. A mobile communication device may comprise any suitable hardware and software for performing such functions, and may also include multiple devices or components (e.g. when a device has remote access to a network by tethering to another device—i.e. using the other device as a modem—both devices taken together may be considered a single mobile communication device).

A "user" may include an individual. In some embodiments, a user may be associated with one or more personal accounts and/or user devices.

A "credential" may be any suitable information that serves as reliable evidence of worth, ownership, identity, or authority. A credential may be a string of numbers, letters, or any other suitable characters that may be present or contained in any object or document that can serve as confirmation.

A "value credential" may be information associated with worth. Examples of value credentials include payment credentials, coupon identifiers, information needed to obtain a promotional offer, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

A "token" may be a substitute value for a credential. A token may be a string of numbers, letters, or any other suitable characters. Examples of tokens include access tokens such as payment tokens, data that can be used to access secure systems or locations, etc.

A "payment token" may include an identifier for a payment account that is a substitute for an account identifier, such as a primary account number (PAN) and/or an expiration date. For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which sensitive data is replaced with substitute data. For example, a real credential (e.g., a primary account number (PAN)) may be tokenized by replacing the real account identifier with a substitute number that may be associated with the real credential. Further, tokenization can be applied to any other information to substitute the underlying information with a token. "Token exchange" or "de-tokenization" can be a process of restoring the data that was substituted during tokenization. For example, a token exchange may include replacing a payment token with its associated primary account number (PAN). Further, de-tokenization or token exchange may be applied to any other information to retrieve the substituted information from a token. In some embodiments, token exchange can be achieved via a transactional message, such as an ISO message, an application programming interface (API), or another type of web interface (e.g., web request).

A "token service computer" can include a system that that services tokens. In some embodiments, a token service computer can facilitate requesting, determining (e.g., generating) and/or issuing tokens, as well as maintaining an established mapping of tokens to primary account numbers (PANs) in a repository (e.g. token vault). In some embodiments, the token service computer may establish a token assurance level for a given token to indicate the confidence level of the token to PAN binding. The token service computer may include or be in communication with a token vault where the generated tokens are stored. The token service computer may support token processing of payment transactions submitted using tokens by de-tokenizing the token to obtain the actual PAN.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service computer that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

"Token expiry date" may refer to the expiration date/time of the token. The token expiry date may be passed among the entities of the tokenization ecosystem during transaction processing to ensure interoperability. The token expiration date may be a numeric value (e.g. a 4-digit numeric value). In some embodiments, the token expiry date can be expressed as an time duration as measured from the time of issuance.

A "token request message" may be an electronic message for requesting a token. A token request message may include information usable for identifying a payment account or digital wallet, and/or information for generating a payment token. For example, a token request message may include payment credentials, mobile communication device identification information (e.g. a phone number or MSISDN), a digital wallet identifier, information identifying a tokenization service provider, a merchant identifier, a cryptogram, and/or any other suitable information. Information included in a token request message can be encrypted (e.g., with an issuer-specific key). In some embodiments, the token request message may include a flag or other indicator specifying that the message is a token request message.

A "token response message" may be a message that responds to a token request. A token response message may include an indication that a token request was approved or denied. A token response message may also include a payment token, mobile communication device identification information (e.g. a phone number or MSISDN), a digital wallet identifier, information identifying a tokenization service provider, a merchant identifier, a cryptogram, and/or any other suitable information. Information included in a token response message can be encrypted (e.g., with an issuer-specific key). In some embodiments, the token response message may include a flag or other indicator specifying that the message is a token response message.

An "authorization request message" may be a message that requests permission to conduct an interaction. For example, an authorization request message may include an electronic message that is sent to a payment processing network and/or an issuer of a payment card to request authorization for a transaction. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. In some embodiments, it may be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. A payment device may be used to make a payment transaction. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of mobile communication devices include pagers, payment cards, security cards, access cards, smart media, transponders, and the like. If the payment device is in the form of a debit, credit, or smartcard, the payment device may also optionally have features such as magnetic stripes. Such devices can operate in either a contact or contactless mode. In some embodiments, a mobile communication device can function as a payment device (e.g., a mobile communication device can store and be able to transmit payment credentials for a transaction).

An "application" may be computer code or other data stored on a computer readable medium (e.g. memory element or secure element) that may be executable by a processor to complete a task.

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card.

A "digital wallet provider" may include an entity, such as an issuing bank or third party service provider, that issues a digital wallet to a user that enables the user to conduct financial transactions. A digital wallet provider may provide standalone user-facing software applications that store account numbers, or representations of the account numbers (e.g., payment tokens), on behalf of a cardholder (or other user) to facilitate payments at more than one unrelated merchant, perform person-to-person payments, or load financial value into the digital wallet. A digital wallet provider may enable a user to access its account via a personal computer, mobile communication device or access device.

A "voice assistant module" can be a digital assistant module that uses voice recognition, natural language processing and speech synthesis to provide aid to users through phones and voice recognition applications. Voice assistants can be built on artificial intelligence (AI), machine learning and voice recognition technology. As the end user interacts with the digital assistant, the AI programming uses sophisticated algorithms to learn from data input and improve at predicting the user's needs. Some assistants are built with more advanced cognitive computing technologies which will allow a digital assistant to understand and carry out multi-step requests with numerous interactions and perform more complex tasks, such as booking seats at a movie theater. Examples of voice assistant modules can include software that is in Apple's Siri™, Microsoft's Cortana™, and Amazon's Alexa™.

FIG. 1 shows a system 100 according to an embodiment. In FIG. 1, the system includes an access device that is "online" and has connectivity to external computers.

The system 100 includes a mobile communication device 102 including a voice assistant module 102A. In some embodiments, the voice assistant module 102A can be part of a digital wallet or an access application such as a payment application. The mobile communication device 102 can be in short range communication with an access device 104. The mobile communication device 102 may also be in long range communication (e.g., via a cellular network and/or the Internet) with a processing computer 108 and an API 106 associated with the access device 104. In one example, the access device 104 may be a vending machine that contains resources (e.g., bottles and cans of beverages). The processing computer 108 can be in communication with the token service computer 112, an authorizing entity computer 110, and the API 106 of the access device 104. In some embodiments, the authorizing entity computer 110 may be operated by an issuer of a payment account number, and the processing computer 108 may be operated by a payment processing organization that performs authorization, clearing, and settlement services on behalf of issuers and acquirers.

Each of the entities in FIG. 1 may communicate through any suitable communication channel or communications network. A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

A method can be described with respect to FIG. 1. The method can include an access device 104 that is "online" or in communication with the processing computer 108.

Initially, a user 101 can register their credentials with the voice assistant module 102A on the mobile communication device 102. The credentials may include an account number such as a credit or debit card account number. For example, the user 101 can do this by inputting their account number into the mobile communication device 102. For example, the user 101 may articulate their account number to the mobile communication device 102 (e.g., "add card number "4242 4242 4242 4242"") or may take a picture of a payment device (e.g., a payment card) that is held by the user.

After the mobile communication device 102 obtains the credentials, the mobile communication device 102 may attempt to tokenize the credentials. This can be desirable to ensure that the credentials are protected when they are on the mobile communication device 102.

In step S102, the mobile communication device 102 can transmit the credentials to the processing computer 108. The credentials may be encrypted before they are sent by the mobile communication device to the processing computer 108. The processing computer 108 can then receive the credentials If the credentials were encrypted, they may be decrypted with an appropriate cryptographic key.

In step S104, after receiving the credentials, the processing computer 108 may transmit a token request message comprising the credentials to the token service computer 112. The token service computer 112 may then exchange the credentials for a token, and may then transmit a token response message comprising the token to the processing computer 108. In some embodiments, the token service computer 112 may generate a token for the received credentials. In other embodiments, the token may have been pre-generated and may be retrieved from a database at the token service computer 112. In either case, the token may be specifically associated with or linked to the received credentials in a database at the token service computer 112.

In step S106, the processing computer 108 can transmit the token to the mobile communication device 102. After the mobile communication device 102 receives the token, the mobile communication device 102 may save it in the voice assistant module 102A so that it may be used in the future by the mobile communication device 102. In some embodiments, the mobile communication device 102 may store the token in a secure element of the mobile communication device 102. Alternatively, the token need not be stored in a secure element on the mobile communication device 102 and may be replaced periodically by the token service computer 112.

At a later time, the user may decide to obtain a resource from the access device 104. The resource could be a ticket, access to an event or secure location, or a good such as that which might be dispensed by a vending machine.

In step S108, a local data connection is formed between the mobile communication device 102 comprising the voice assistant module 102A, and the access device 104 in an interaction. The user 101 may need to manipulate the mobile communication device 102 in some manner to form the local data connection, and may need to activate the voice assistant module 102A. In an example, the user taps their mobile communication device 102 against an NFC (near field communications) reader on the access device 104. This establishes a local data connection between the voice assistant module 102A in the mobile communication device 102, and the access device 104. In other embodiments, a different type of location data connection such as a Bluetooth connection may be formed between the mobile communication device 102 and the access device 104.

In the interaction between the voice assistant module 102A and the access device 104, the access device 104 provides the voice assistant module 102A with the address of the API 106 associated with the access device 104. The voice assistant module 102A may then communicate with the access device 104 via the API 106 (step S110). At this point, the mobile communication device 102 and the access device 104 may communicate in a communication session through a long range communication channel such as one that uses the Internet or a cellular communication network.

Once the voice assistant module 102A in the mobile communication device 102 is in communication with the API 106 associated with the access device 104, the user can query the access device 104 via the voice assistant module 102A. The voice assistant module 102A in the mobile communication device 102 can also receive a voice command with a request for the access device 104 to automatically provide a resource that is held by the access device 104 to the user 101 of the mobile communication device 102. For example, the user 101 may ask the voice assistant module 102A on the mobile communication device 102 questions such as: "What drinks do you have?"; or "How much is the bottle of Brand X water?," etc. The voice assistant module 102A can translate the user's questions into an API request, and send the request including data representing the voice command to the access device 104 via the API 106. When the user 101 wants to purchase a resource provided by the access device 104, the user 101 can provide a command such as: "Please give me one bottle of Brand X water" to the voice assistant module 102A. The voice assistant module 102A and the processor in the mobile communication device 102 can then receive this command, and can generate and transmit a request comprising the token previously stored on the mobile communication device 102, and data representing the voice command to the access device 104 via the access device API 106. When the access device API 106 receives the request including the token and the command, as shown in steps S112, S122, the access device 104 can transmit an authorization request message comprising the amount of the requested resource, the token, an access device identifier, and any other pertinent information to the processing computer 108.

In step S114, the processing computer 108 may receive the authorization request message, and may detokenize the token by communicating with the token service computer 112. The processing computer 108 may make a request to obtain the credential that was associated with the token. After the token service computer 112 receives the request, it may look up the credentials (e.g., a primary account number) corresponding to the received token, and may return the credentials to the processing computer 108. After receiving the credentials, the processing computer 108 may then modify the authorization request message to include the credentials, instead of the token.

In step S116, the authorization request message comprising the amount of the requested resource and the credential is transmitted to the authorizing entity computer 110. After receiving the authorization request message, the authorizing entity computer 110 may then authorize or not authorize the transaction. After making the authorization decision, the authorizing entity computer 110 may generate an authorization response message with its decision. Criteria which the authorizing entity computer may use to authorize or not authorize the transaction may include a risk associated with the transaction, as well as whether or not the user 101 has sufficient credit or funds to obtain the requested resource.

In step S118, the authorization response message S118 may then be transmitted to the processing computer 108. The processing computer 108 may then communicate with the token service computer 112 in step S115 to obtain the token associated with the credential. The token service computer 112 can use the credential to search a database for the token that corresponds to the credential in the authorization response message.

In step S120, the authorization response message comprising the token may be transmitted to the access device 104 via the access device API 106. Once the authorization response message is received by the access device 104, the access device 104 knows that the payment has been processed. The access device 104 can then release the requested resource (e.g., a bottle of water) and the transaction is complete. At a later date or time, a clearing and settlement process may take place between a transport computer (not shown) operated by an acquirer associated with the access device 104, the processing computer 108, and the authorizing entity computer 110.

In the example described above in FIG. 1, an original credential such as a payment account number is tokenized using a token service computer 112. However, in other embodiments, it is not necessary to tokenize an original credential. In some embodiments, the original credential may be stored on the mobile communication device 102, and the mobile communication device may transmit the original credential to the access device 204. The access device 204 could generate an authorization request message and transmit the same to the authorizing entity computer 210 via the processing computer 208 for authorization.

Figure 2:
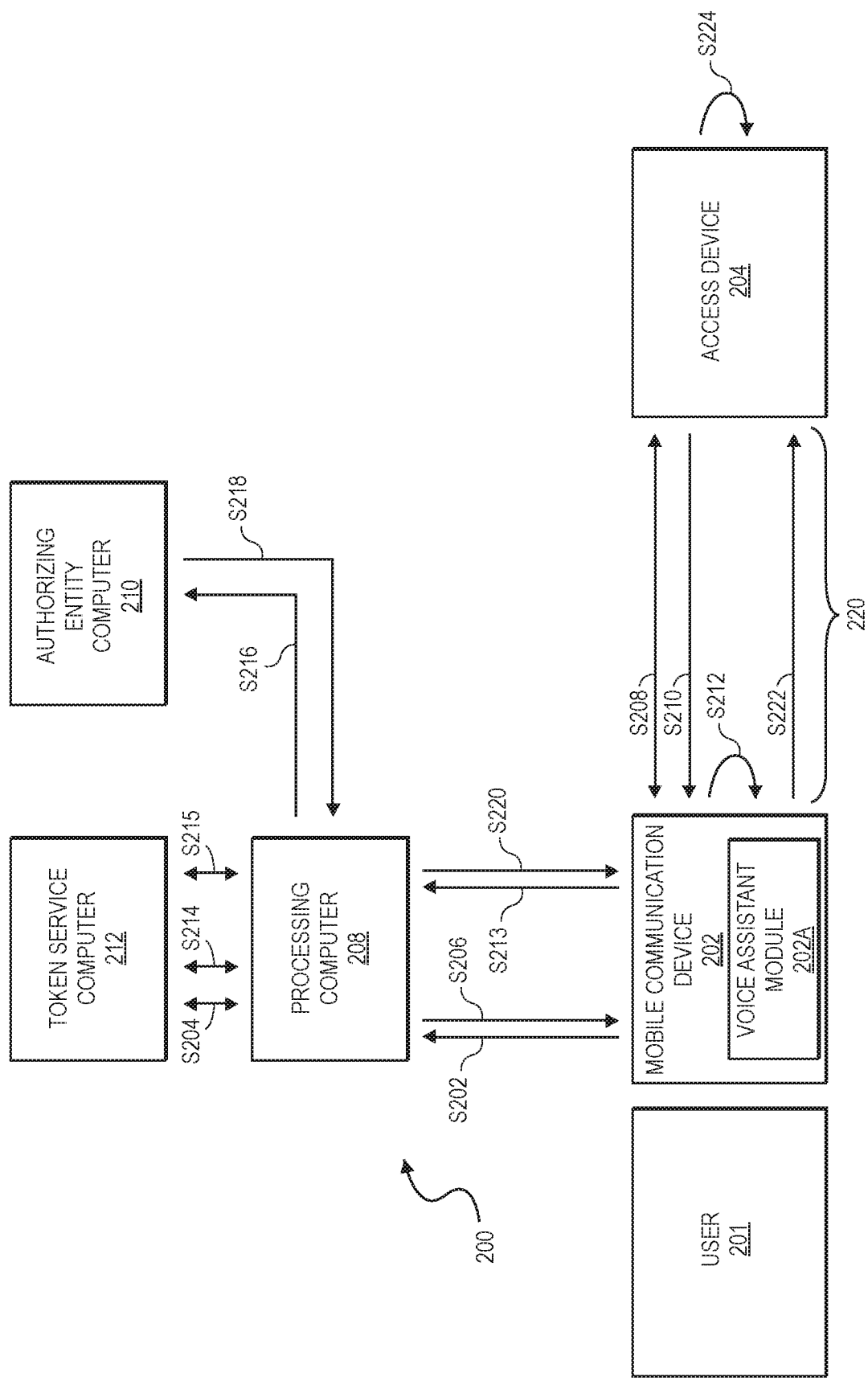
FIG. 2 shows another block diagram of a system along with a process flow according to another embodiment.

FIG. 2 shows a system and a method for obtaining a resource from an access device, where the access device is "offline." In this situation, the access device has no direct connection to the Internet.

FIG. 2 shows a system 200 according to an embodiment. The system 200 includes a mobile communication device 202 including a voice assistant module 202A. The mobile communication device 202 can be in short range communication with an access device 204. The mobile communication device 202 may also be in long range communication with a processing computer 208. The processing computer 208 can be in communication with the token service computer 212, and an authorizing entity computer 210. Compared to the system in FIG. 1, the access device 204 does not include an API that allows it to communicate remotely with external computers.

In this embodiment, the processing computer 208 and the access device 204 may share corresponding keys in a pair of cryptographic keys. For example, in some embodiments, the processing computer 208 and the access device 204 may each store a symmetric key of a symmetric key pair such that information may be encrypted and decrypted between them. In other embodiment, the access device 204 may store a private key and the processing computer 208 may store a public key of a public/private key pair. In such embodiments, the access device 208 may generate the public/private key pair, and may transmit the public key to the processing computer 208. Although the embodiments described below describe the processing computer 208 as holding a cryptographic key that corresponds to another cryptographic key in the access device 204, in other embodiments, the authorizing entity computer 210 or any other suitable computer may hold the cryptographic key that corresponds to the cryptographic key in the access device 204.

In FIG. 2, the mobile device 202, the processing computer 208, the token service computer 212, and the authorizing entity computer 210 may communicate through any suitable communication channel or communications network. A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Initially, a user 201 can register their credentials with the voice assistant module 202A on the mobile communication device 202. The credentials may include an account number such as a credit or debit card account number. For example, the user 201 can do this by inputting their account number into the mobile communication device 202. For example, the user 201 may articulate their account number to the mobile communication device 202 (e.g., "add card number "4242 4242 4242 4242"") or may take a picture of a payment device (e.g., a payment card) that is held by the user.

After the mobile communication device 202 obtains the credentials, the mobile communication device 202 may attempt to tokenize the credentials. This can be desirable to ensure that the credentials are protected when they are on the mobile communication device 202.

In step S202, the mobile communication device 202 can transmit the credentials to the processing computer 208. The credentials may be encrypted before they are sent by the mobile communication device to the processing computer 208. The processing computer 208 can then receive the credentials If the credentials were encrypted, they may be decrypted with an appropriate cryptographic key.

In step S204, after receiving the credentials, the processing computer 108 may transmit a token request message comprising the credentials to the token service computer 212. The token service computer 212 may then exchange the credentials for a token, and may then transmit a token response message comprising the token to the processing computer 208. In some embodiments, the token service computer 212 may generate a token for the received credentials. In other embodiments, the token may have been pre-generated and may be retrieved from a database. In either case, the token may be specifically associated with or linked to the received credentials in a database at the token service computer.

In step S206, the processing computer 208 can transmit the token to the mobile communication device 202. After the mobile communication device 202 receives the token, the mobile communication device 202 may save it in the voice assistant module 202A so that it may be used in the future by the mobile communication device 202.

At a later time, the user may decide to obtain a resource from the access device 204. The resource could be a ticket, access to an event or secure location, or a good such as that which might be dispensed by a vending machine.

In step S208, a local data connection is formed between the mobile communication device 102 comprising the voice assistant module 202A, and the access device 204 in an interaction. The user 101 may need to manipulate the mobile communication device 102 in some manner to form the local data connection, and may need to activate the voice assistant module 102A. In an example, the user taps their mobile communication device 102 against an NFC (near field communications) terminal on the access device 104. In other embodiments, the local data connection may be formed using Bluetooth or other suitable communication protocol. This establishes a local data connection between the voice assistant module 102A in the mobile communication device 102, and the access device 104.

In step 210, after the local data connection is formed, the access device 204 then responds to the voice assistant module 202A in the mobile communication device 102 with information about the specific access device 104, and optionally details about the resources that it contains. For example, the access device 104 may transmit a message to the mobile communication device 202. The message may contain data representing the phrase "Hello, I am vending machine 123456. What would you like today?" The message may also contain information including an access device identifier for the access device 204, and information regarding what resources the access device 204 contains (e.g., how much each resource costs, how many resources are in the access device, resource identifiers such as SKU numbers, etc.).

In step S212, after receiving an indication that the mobile communication device 202 and the access device are connected, the user 201 can query the access device 204 for any information about the resources that it has. For example, the user 201 may ask the access device 204 via the voice assistant module 202A in the mobile communication device 202 questions such as: "What drinks do you have?"; and/or "How much is a bottle of water?." The user 201 may alternatively or additionally issue a command to the access device 204 via the voice assistant module 202A. An example of a command might be: "Give me one bottle of Brand X water."

In step S213, after receiving the command, the voice assistant module 202A can generate and transmit an authorization request message comprising the token and the price of the requested resource to the processing computer 108 along with details about the user's order (total amount etc.).

In step S214, the processing computer 208 may receive the authorization request message, and may detokenize the token by communicating with the token service computer 212. The processing computer 208 may make a request to obtain the credential that was associated with the token. After the token service computer 212 receives the request, it may look up the credentials (e.g., a primary account number) corresponding to the received token, and may return the credentials to the processing computer 208. After receiving the credentials, the processing computer 208 may then modify the authorization request message to include the credentials, instead of the token.

In step S216, the authorization request message comprising the amount of the requested resource and the credential is transmitted to the authorizing entity computer 210. After receiving the authorization request message, the authorizing entity computer 210 may then authorize or not authorize the transaction. After making the authorization decision, the authorizing entity computer 210 may generate an authorization response message with its decision. Criteria which the authorizing entity computer may use to authorize or not authorize the transaction may include a risk associated with the transaction, as well as whether or not the user 201 has sufficient credit or funds to obtain the requested resource.

In step S218, the authorization response message S218 may then be transmitted to the processing computer 208. The processing computer 208 may then communicate with the token service computer 212 in step S215 to obtain the token associated with the credential. The token service computer 212 can use the credential to search a database for the token that corresponds to the credential in the authorization response message.

After receiving the credential from the token service computer 212, the processing computer 208 can the encrypt the authorization request message or data (e.g., an approval indicator or a cryptogram that specifically indicates authorization by an authorizing entity computer) in the authorization response message using a first key that forms part of a cryptographic key pair. The other key of the key pair may be stored in the access device 204. After encrypting, the processing computer 208 can then send the authorization response back to the voice assistant module 202A in the mobile communication device 202 in step S220.

In step S222, after receiving the authorization response message, the mobile communication device 202 can transmit the encrypted authorization response message or the authorization response message with the encrypted data in it to the access device 204. If the local data connection between the mobile communication device 202 and the access device 204 is still present (e.g., if a Bluetooth connection is used), then the user 201 may not be aware that the data transmission is occurring. In other embodiments, if the local data connection was short-lived (as in the case of NFC), then the user 201 may be asked to manipulate the mobile communication device 202 in a particular manner. For example, the user 201 may be asked by the mobile communication device 202 to tap the mobile communication device 202 against the access device 204.

In step S224, after receiving the encrypted authorization response message or the authorization response message with encrypted data, the access device 204 can attempt to decrypt the authorization response message or the encrypted data in the authorization response message using a second cryptographic key that corresponds to the cryptographic key used to encrypt the data or the authorization request message. If the access device 204 is able to do so, and to recover the originally encrypted data (e.g., plaintext data), then the access device 204 will know that the transaction was authorized by the authorizing entity computer 210, and may then provide the requested resource to the user. At a later date or time, a clearing and settlement process may take place between a transport computer (not shown) operated by an acquirer associated with the access device 204, the processing computer 208, and the authorizing entity computer 210.

In the example described above in FIG. 2, an original credential such as a payment account number is tokenized using a token service computer 112. However, in other embodiments, it is not necessary to tokenize an original credential. In some embodiments, the original credential may be stored on the mobile communication device 202, and the mobile communication device may generate an authorization request message and transmit the same to the authorizing entity computer 210 via the processing computer 208 for authorization.

Figure 3:
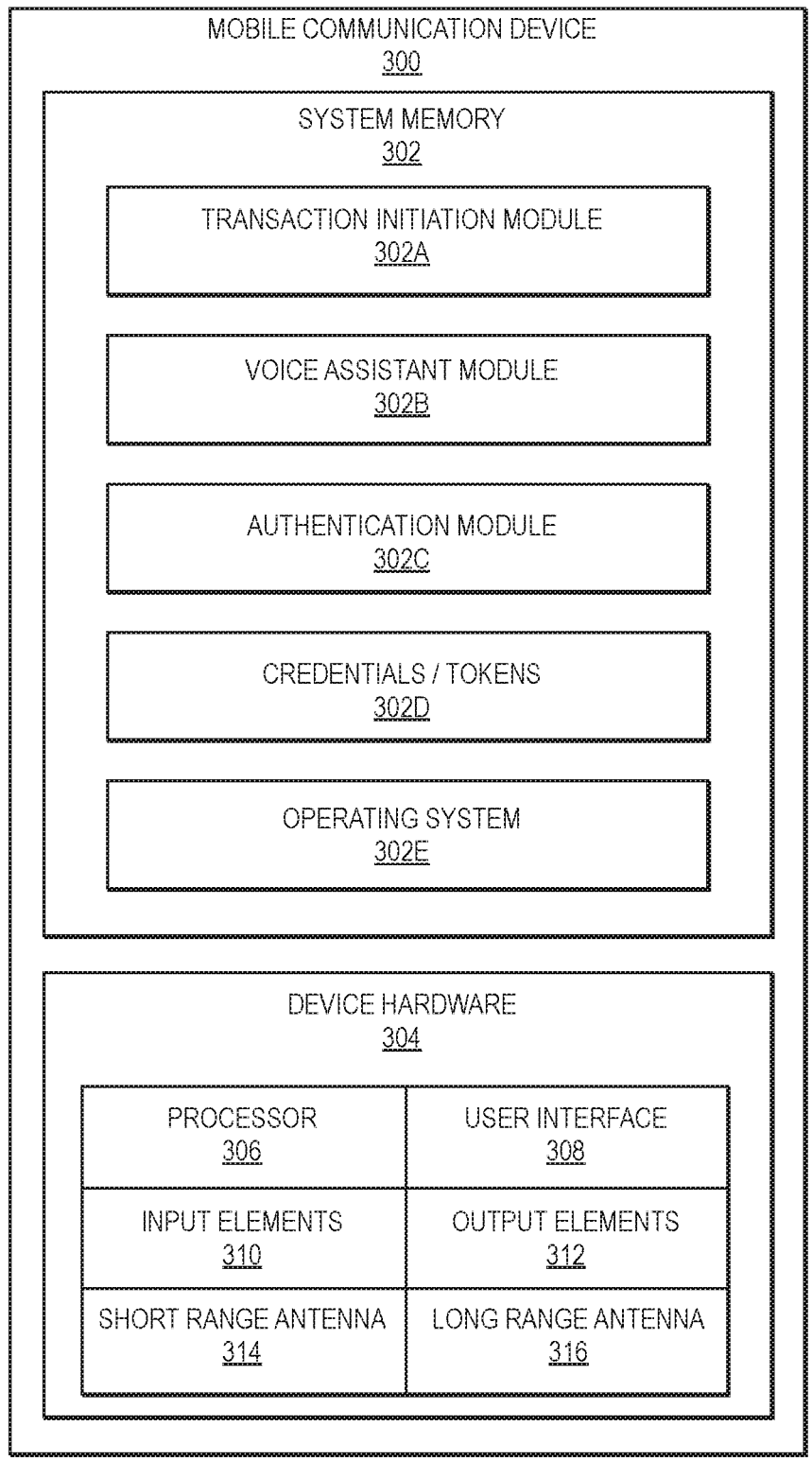
FIG. 3 shows a block diagram of a mobile communication device according to an embodiment.

FIG. 3 illustrates a mobile communication device 300 according to an embodiment. Mobile communication device 300 may include device hardware 304 coupled to a system memory 302.

Device hardware 304 may include a processor 306, a short range antenna 314, a long range antenna 316, input elements 310, a user interface 308, and output elements 312 (which may be part of the user interface 308). Examples of input elements may include microphones, keypads, touchscreens, sensors, etc. Examples of output elements may include speakers, display screens, and tactile devices. The processor 306 can be implemented as one or more integrated circuits (e.g., one or more single core or multicore microprocessors and/or microcontrollers), and is used to control the operation of mobile communication device 300. The processor 306 can execute a variety of programs in response to program code or computer-readable code stored in the system memory 302, and can maintain multiple concurrently executing programs or processes.

The long range antenna 316 may include one or more RF transceivers and/or connectors that can be used by mobile communication device 300 to communicate with other devices and/or to connect with external networks. The user interface 308 can include any combination of input and output elements to allow a user to interact with and invoke the functionalities of mobile communication device 300. The short range antenna 809 may be configured to communicate with external entities through a short range communication medium (e.g. using Bluetooth, Wi-Fi, infrared, NFC, etc.). The long range antenna 819 may be configured to communicate with a remote base station and a remote cellular or data network, over the air.

The system memory 302 can be implemented using any combination of any number of non-volatile memories (e.g., flash memory) and volatile memories (e.g. DRAM, SRAM), or any other non-transitory storage medium, or a combination thereof media. The system memory 302 may store computer code, executable by the processor 805, for performing any of the functions described herein. For example, the system memory 302 may comprise a computer readable medium comprising code, executable by the processor 306, for implementing a method comprising: forming a local data connection between a mobile communication device comprising a voice assistant module, and an access device in an interaction; and receiving, by the mobile communication device, a voice command with a request for the access device to automatically provide a resource to a user of the mobile communication device The system memory 302 may also store a transaction initiation module 302A, a voice assistant module 302B, an authentication module 302C, credentials 302D, and an operating system 302E, The transaction initiation module 302A may include instructions or code initiating and conducting a transaction with an external device such as an access device or a processing computer. It may include code, executable by the processor 306, for generating and transmitting authorization request messages, as well as receiving and forwarding authorization response messages. It may also include code, executable by the processor 306, for forming a local connection or otherwise interacting with an external access device. The voice assistant module 302B may comprise code, executable by the processor 306, to receive voice segments, and generate and analyze data corresponding to the voice segments. The authentication module 302C may comprise code, executable by the processor 306, to authenticate a user. This can be performed using user secrets (e.g., passwords) or user biometrics.

System memory 302 may also store credentials and/or tokens 302D. Credentials may also include information identifying the mobile communication device 300 and/or the user of the mobile communication device 300. Examples of credentials may include a public key associated with the mobile communication device 300 and/or a user of the mobile communication device 300, a digital signature (e.g., the public key of the mobile communication device 300 signed by a key of the authentication system), payment credentials, biometric data (e.g., biometric samples or templates), etc.

Figure 4:
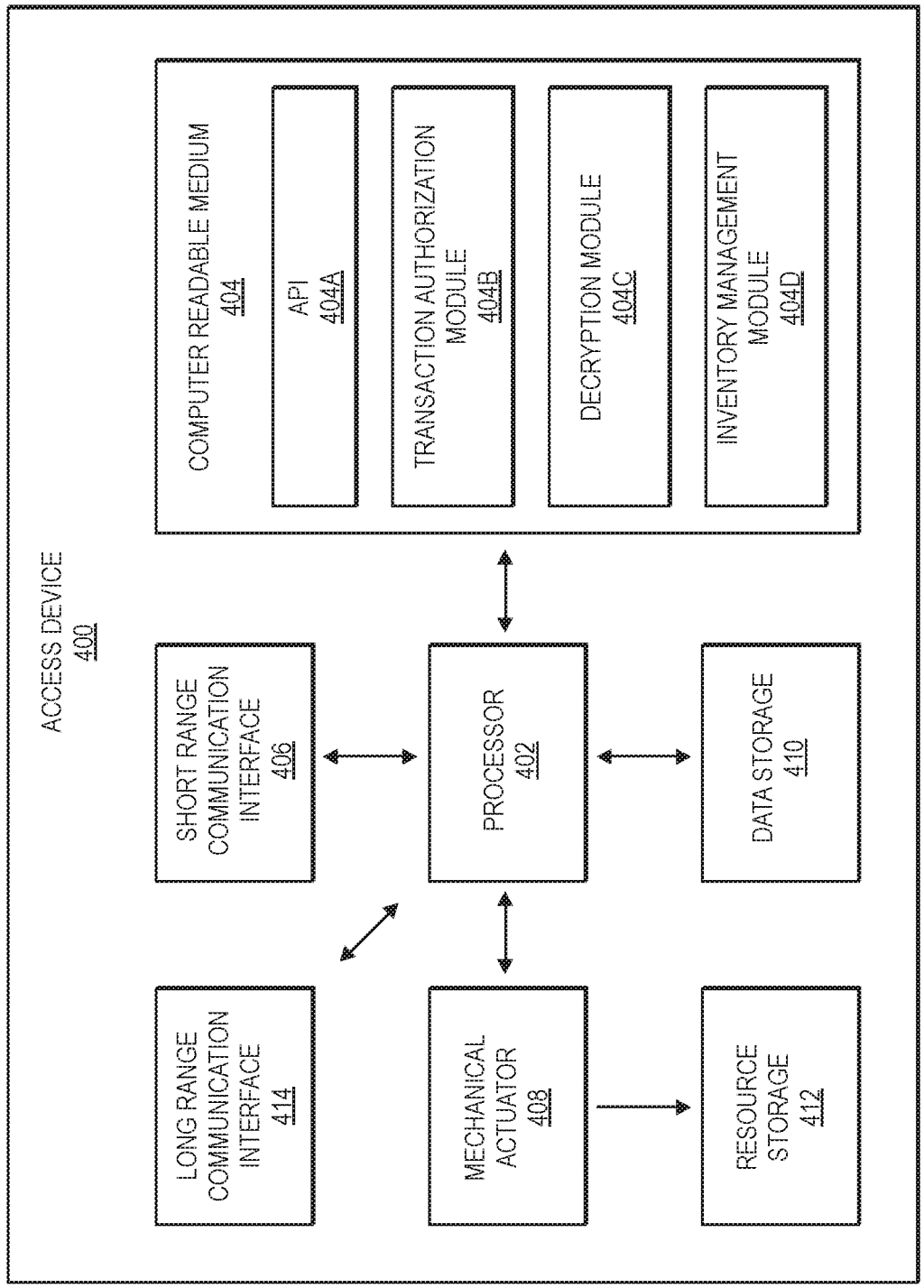
FIG. 4 shows a block diagram of an access device according to an embodiment.

FIG. 4 shows a block diagram showing components in an exemplary access device 400. The access device 400 may comprise a processor 402. It may also comprise a computer readable medium 404, a short range communication interface 406, a long range communication interface 414, a data storage 410, and a mechanical actuator 408 operationally coupled to the processor 402. The mechanical actuator 408 may include robotic arm, pusher, or other device that can manipulate a physical resource (e.g., a ticket, a bottle of water, etc.) so that it may be dispensed or provided to a user, A resource storage 412 for storing resources may be in communication with the mechanical actuator 408. The resource storage 412 may comprise a storage unit which may be a controlled environment such as a refrigerated environment.

The computer readable medium 404 may store code or instructions for allowing access device 400 to operate in the manner described herein. The instructions may be executed by the processor 402. For example, the computer readable medium 404 may comprise code or instructions for: forming a local data connection between a mobile communication device comprising a voice assistant module, and an access device in an interaction; and automatically providing, by the access device, a resource to a user of the mobile communication device after the mobile communication device receives a voice command with a request for the access device to automatically provide the resource to the user of the mobile communication device.

The computer readable medium 404 may further comprises an API module 404A, a transaction authorization module 404B, a decryption module 404C, and an inventory management module 404D. The AP module 404A may comprise software which will allow the access device 400 to communicate with an external computer. The decryption module 404C may comprise code, executable by the processor 402, to obtain cryptographic keys (e.g., from the data storage 410), and decrypt an authorization request message or data within the authorization request message. The inventory management module 404D may comprise code, executable by the processor 402, to manage the inventory of resources in the resource storage 412, For example, if the access device 400 is out of resources or will be out of resources soon, then it may notify a resource provider that the access device 400 needs to be re-stocked with resources.

Figure 5:
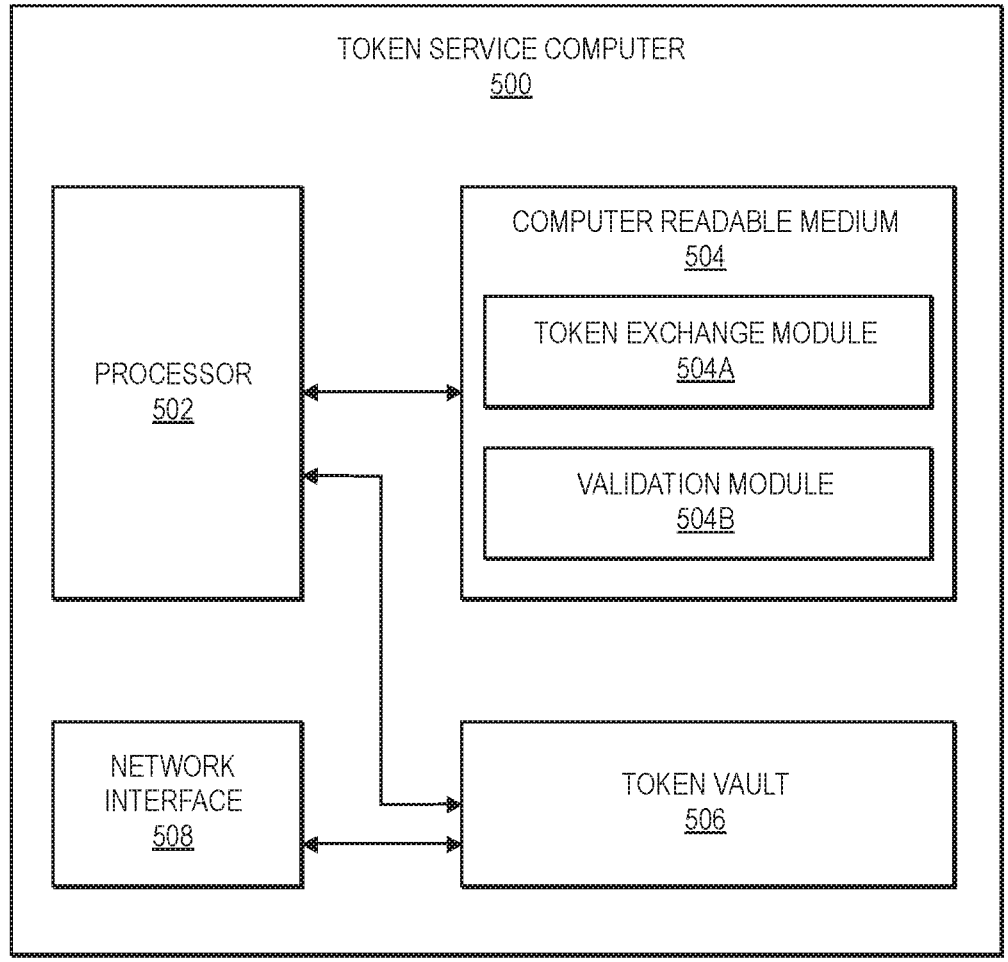
FIG. 5 shows a block diagram of a token service computer according to an embodiment.

FIG. 5 shows a token service computer 500. The token service computer 500 includes a processor 502 and a computer readable medium 504, a token vault 506, and a network interface 508 coupled to the processor 502.

The computer readable medium 504 may comprise a token exchange module 504A and a validation module 504B.

The token vault 506 may store tokens and their associated credentials in a database. The token vault 506 may store data in a database such as an Oracle™ database.

The tokenization exchange module 504A may comprise code that causes the processor 502 to provide access tokens. For example, the token exchange module 504A may contain logic that causes the processor 502 to generate a payment token and/or associate the payment token with a set of payment credentials. A token record may then be stored in a token record database indicating that the payment token is associated with a certain user or a certain set of payment credentials.

The validation module 504B may comprise code that causes the processor 502 to validate token requests before a payment token is provided. For example, validation module 504B may contain logic that causes the processor 502 to confirm that a token request message is authentic by decrypting a cryptogram included in the message, by confirming that the payment credentials are authentic and associated with the requesting device, by assessing risk associated with the requesting device.

Figure 6:
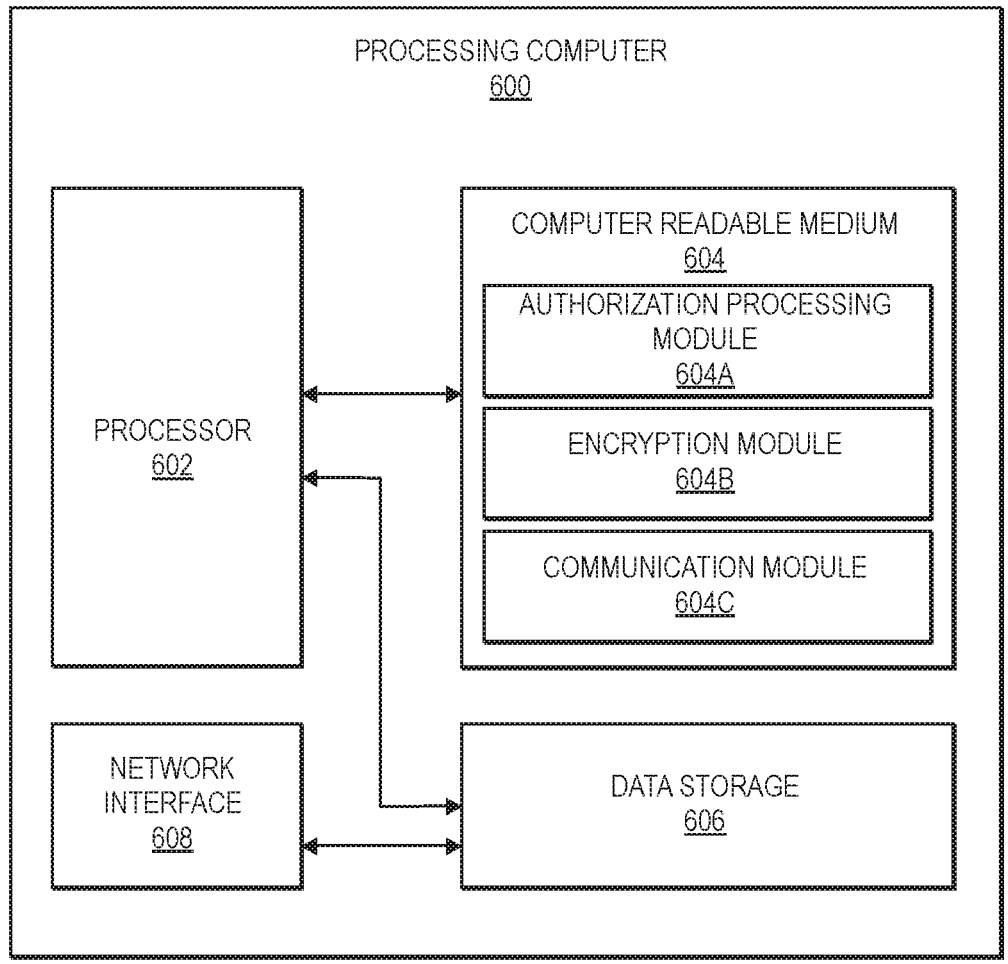
FIG. 6 shows a block diagram of a processing computer according to an embodiment.

FIG. 6 shows a block diagram of a processing computer 108 according to an embodiment. The processing computer 600 may comprise a processor 602, which may be coupled to a computer readable medium 604, data storage 606, and a network interface 608. The data storage 606 may contain access data such as tokens and/or account data, as well as mappings between access data, credentials, and/or communication device identifiers such as phone numbers, IP addresses, device identifiers, etc.

The computer readable medium 604 may comprise a number of software modules including an authorization processing module 604A, an encryption module 604B, and a communication module 604C. The computer readable medium may also comprise a clearing and settlement module (not shown).

The authorization processing module 604A may comprise code that can cause the processor 602 to evaluate authorization request messages for transactions and determine if the transactions should be authorized. The authorization processing module 604A may also include code for routing or modifying authorization request and response messages as they pass between various parties such as authorizing entity computers (e.g., issuer computers) and transport computers (e.g., acquirer computers).

The encryption/decryption module 604B may include any suitable encryption/decryption algorithms to encrypt data in embodiments of the invention. Suitable data encryption/decryption algorithms may include DES, triple DES, AES, etc. It may also store encryption keys that can be used with such encryption/decryption algorithms. The encryption module 604B may utilize symmetric or asymmetric encryption techniques to encrypt and/or verify data. Cryptographic keys that may be used by the encryption/decryption module 604B may be securely stored in the data storage 606.

The communication module 604C may comprise code that causes the processor 602 to generate messages, forward messages, reformat messages, and/or otherwise communicate with other entities.

Embodiments of the invention have a number of advantages. Embodiments of the invention can allow users to interact with their own mobile communication devices to obtain resources from access devices, whether or not the access devices are online or offline. Further, embodiments of the invention protect sensitive information such as personal credentials, by tokenizing the credentials. Such credentials are therefore not subject to man-in-the-middle attacks or malicious data breaches. Further, embodiments of the invention are convenient, as users are interacting with the access devices using a familiar interface and users do not need to physically interact with user interfaces on the access devices. In the latter case, individuals who may be unable to touch or otherwise manipulate the user interfaces on the access devices can obtain the resources provided by the access devices, despite their inability to interact such access device user interfaces.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
    receiving, by a mobile communication device, a token;
    saving, by the mobile communication device, the token to a voice assistant module of the mobile communication device, wherein the voice assistant module is associated with a payment application;
    forming a local data connection between the mobile communication device and an access device for conducting an interaction for a resource at the access device, wherein the access device is a device for which a user cannot physically input data; and receiving, by the mobile communication device, a voice command with a request for the access device to automatically provide a resource requested by the user of the mobile communication device using the saved token obtained from the voice assistant module, wherein the saved token is the token saved to the voice assistant module.

2. The method of claim 1, further comprising:

after forming, and before receiving the voice command, receiving, by the mobile communication device from the access device, an address for an API associated with the access device; and after receiving the voice command, transmitting, by the mobile communication device, data representing the voice command and a credential or a token to the API using the address, thereafter causing the access device to automatically provide the resource to the user.

3. The method of claim 1, further comprising:

after receiving the voice command, transmitting, by the mobile communication device, a credential or a token to a processing computer, wherein the processing computer processes the interaction using the credential or the token, and encrypts an authorization response message using a first cryptographic key to form an encrypted authorization response message;

receiving, by the mobile communication device, the encrypted authorization response message; and transmitting, by the mobile communication device, the encrypted authorization response message to the access device, wherein the access device decrypts the authorization response message using a second cryptographic key, and automatically provides the resource to the user.

4. The method of claim 3, wherein the first cryptographic key is a public key and the second cryptographic key is a private key.

5. The method of claim 3, wherein the token is transmitted to the processing computer.

6. The method of claim 1, wherein the access device comprises a resource storage area that stores a plurality of resources.

7. The method of claim 1, wherein the access device operates in an offline mode.

8. The method of claim 1, further comprising:

after receiving the voice command, transmitting, by the mobile communication device, a credential or token to a processing computer, wherein the processing computer processes the interaction using the credential or the token, and encrypts data in an authorization response message using a first cryptographic key to form an authorization response message with encrypted data;

receiving, by the mobile communication device, the authorization response message; and transmitting, by the mobile communication device, the authorization response message to the access device, wherein the access device decrypts the encrypted data in the authorization response message using a second cryptographic key, and then automatically provides the resource to the user.

9. The method according to claim 1, wherein the voice assistant module is a component of the payment application.

10. A mobile communication device comprising:

a processor; and a computer readable medium coupled to the processor and containing instructions for causing the processor to perform a method comprising:

receiving, by the mobile communication device, a token;

saving, by the mobile communication device, the token to a voice assistant module of the mobile communication device, wherein the voice assistant module is associated with a payment application;

forming a local data connection between the mobile communication device, and an access device for conducting an interaction for a resource at the access device, wherein the access device is a device for which a user cannot physically input data; and receiving, by the mobile communication device, a voice command with a request for the access device to automatically provide a resource requested by the user of the mobile communication device using the saved token obtained from the voice assistant module, wherein the saved token is the token saved to the voice assistant module.

11. The mobile communication device of claim 10, wherein the method further comprises:

after receiving the voice command, transmitting, by the mobile communication device, a credential or a token to a processing computer, wherein the processing computer processes the interaction using the credential or the token, and encrypts an authorization response message using a first cryptographic key to form an encrypted authorization response message;

receiving, by the mobile communication device, the encrypted authorization response message; and transmitting, by the mobile communication device, the encrypted authorization response message to the access device, wherein the access device decrypts the authorization response message using a second cryptographic key, and automatically provides the resource to the user.

12. The mobile communication device of claim 10, wherein the method comprises:

after receiving the voice command, transmitting, by the mobile communication device, a credential or a token to a processing computer, wherein the processing computer processes the interaction using the credential or the token, and encrypts an authorization response using a first cryptographic key to form an encrypted authorization response;

receiving, by the mobile communication device, the encrypted authorization response; and transmitting, by the mobile communication device, the encrypted authorization response to the access device, wherein the access device decrypts the authorization response using a second cryptographic key, and automatically provides the resource to the user.

13. The mobile communication device of claim 12, wherein the token is an access token.

14. The mobile communication device of claim 10, further comprising short range antenna and a long range antenna coupled to the processor.

15. The mobile communication device of claim 10, wherein the method comprises:

after receiving the voice command, transmitting, by the mobile communication device, a credential or a token to a processing computer, wherein the processing computer processes the interaction using the credential or the token, and encrypts data in an authorization response message using a first cryptographic key to form an authorization response message with encrypted data;

receiving, by the mobile communication device, the authorization response message; and transmitting, by the mobile communication device, the authorization response message to the access device, wherein the access device decrypts the encrypted data in the authorization response message using a second cryptographic key, and then automatically provides the resource to the user.

16. A method comprising:

forming a local data connection between a mobile communication device and an access device for conducting an interaction for a resource at the access device, wherein the access device is a device for which a user cannot physically input data, wherein a token is saved to a voice assistant module of the mobile communication device, wherein the voice assistant module is associated with a payment application; and automatically providing, by the access device, a resource to the user of the mobile communication device after the mobile communication device receives a voice command with a request for the access device to automatically provide the resource to the user of the mobile communication device using the saved token obtained from the voice assistant module, wherein the saved token is the token saved to the voice assistant module.

17. The method of claim 16, further comprising:

transmitting, by the access device to the mobile communication device, an address of an API associated with the access device; and receiving, by the access device via the API, a command message to dispense a resource.

18. The method of claim 16, further comprising:

receiving, by the access device, an encrypted authorization response message from the mobile communication device, wherein the authorization response message was encrypted using a first key by a processing computer; and decrypting, by the access device, the encrypted authorization response message using a second key, wherein decrypting the encrypted authorization response message causes the access device to dispense the resource.

19. The method of claim 16, wherein the access device operates in an offline mode when dispensing the resource.

20. The method of claim 16, further comprising:

receiving, by the access device, an authorization response message comprising encrypted data from the mobile communication device, wherein the data was encrypted using a first key by a processing computer; and decrypting, by the access device, the data using a second key, wherein decrypting the encrypted data causes the access device to dispense the resource.

* * * * *